United States Patent [19]

Lackowski et al.

[11] Patent Number: 5,029,035
[45] Date of Patent: Jul. 2, 1991

[54] TAPE GUIDE FOR GUIDING MAGNETIC TAPE IN A VIDEOTAPE CASSETTE

[75] Inventors: Robert Lackowski, Mount Prospect; Vasilios Mihalopoulos, Des Plaines, both of Ill.

[73] Assignee: Overland Bolling Company, Franklin Park, Ill.

[21] Appl. No.: 321,096

[22] Filed: Mar. 9, 1989

[51] Int. Cl.$^5$ .................... G11B 23/087; B65H 23/04
[52] U.S. Cl. ..................................... 360/132; 226/196
[58] Field of Search .................... 360/132; 242/199; 226/196

[56] References Cited

U.S. PATENT DOCUMENTS 4,228,940 10/1980 Umehara ............................ 226/196
4,770,367 9/1988 Carroll ............................... 242/199
4,773,615 9/1988 Carroll ............................... 242/199

Primary Examiner—Robert S. Tupper

[57] ABSTRACT

A tape guide for use in a magnetic tape cassette for guiding the magnetic tape includes a cylindrical member having a slit extending along its length. The slit defines first and second edge forces that face each other. In one embodiment, a plurality of tabs are connected to the first and second edge faces of the cylindrical member and extend towards the oppositely positioned edge face. The tabs overlap one another and serve to inhibit the tape guide from becoming interlocked with another tape guide. In another embodiment, a plurality of outdented portions extend from both edge faces and each outdented portion is positioned opposite to an indented portion on the opposite edge face.

19 Claims, 3 Drawing Sheets 5,029,035

TAPE GUIDE FOR GUIDING MAGNETIC TAPE IN A VIDEOTAPE CASSETTE

BACKGROUND AND SUMMARY OF THE PRESENT INVENTION

The present invention relates to videotape cassettes containing magnetic tapes. More particularly, the present invention concerns a tape guide that is adapted to be positioned on the interior of the videotape cassette for guiding the magnetic tape as it passes from spool to spool.

Tape guides are a necessary part of every videotape cassette in order to ensure that the tape is properly guided and fed to the access opening at the front edge of the videotape cassette when the cassette is inserted into the tape deck for playing. The number of tape guides produced annually in order to meet the needs of the magnetic tape cassette manufacturing industry is enormously large. At the very least, the number of tape guides produced annually is in the neighborhood of several hundred million. Thus, it can be readily seen that any cost reduction that can be achieved with respect to the manufacture of a single tape guide can result in significant overall cost savings when considered in light of the total number of tape guides manufactured.

Typically, a hollow stand-alone tape guide for use in a videotape cassette is manufactured from stainless steel having a thickness of approximately 0.021–0.022 inches and in some cases, as thin as 0.015 inches. After the tape guide has been manufactured from the aforementioned material, it is subjected to chemical treatment as well as polishing and finishing operations in order to ensure that the exterior finish on the tape guides is smooth and free of any burrs or other foreign material and so smooth that it does not adversely affect magnetic tape sliding on its surface.

The magnetic tape contained in the videotape cassette is made of a highly sensitive material that can be very easily damaged through contact with rough surfaces and the like. Thus, the aforementioned chemical treatment and polishing and finishing operations are necessary in order to produce a tape guide whose exterior surface has a very high quality finish. In that way, the magnetic tape that passes around the tape guide will not become damaged as a result of contact with burrs or other types of foreign objects located on the exterior surface of the tape guide.

The finish required on the exterior surface of the tape guide, otherwise described as the surface roughness, can be expressed numerically in microinches. The numerical designation represents the arithmetic average deviation of the exterior surface from the mean line in a profile. The desired roughness for the exterior surface of a tape guide for use in guiding the magnetic tape in a videotape cassette should preferably be about eight microinches. It is rather evident that such a smooth, high quality surface finish requires extensive chemical treatment and finishing and polishing which can significantly increase the cost associated with producing the tape guide.

From the foregoing discussion, it can be seen that it would be highly desirable to manufacture a tape guide for use in a videotape cassette that possesses all of the necessary physical properties and structural features required of the tape guide but which is thinner. The manufacture of a thinner tape guide would permit the realization of substantial cost savings.

The manufacture of a tape guide from thinner material does, however, raise a concern that when the tape guide interacts with another tape guide such as during chemical treatment, polishing, finishing or handling of the tape guide, the two tape guides will become interlocked with one another. When a tape guide is manufactured as a one piece unit with a slit extending longitudinally along its length, a gap is formed in the unit as a result of the slit. In prior art stand-alone tape guides, the thickness of the material used to manufacture the tape guides was greater than the width of the gap. Hence, it was quite unlikely that one tape guide would become interlocked with another tape guide because the tape guide was not thin enough to fit into the gap formed by the slit.

However, the manufacture of a tape guide from much thinner material raises the possibility that the tape guide will become interlocked with another tape guide during the finishing, chemical treatment and handling of the tape guide because the thickness of the material is less than the width of the gap in the tape guide formed by the slit. Since the thickness of the material used to manufacture the tape guide is less than the width of the gap formed by the slit, it is highly probable that while the tape guide is interacting with other tape guides, one tape guide will be pushed into the slit in another tape guide to thereby result in the two tape guides becoming interlocked with one another.

The problems resulting from interlocked tape guides are readily apparent. The time and cost associated with attempting to separate the interlocked tape guides are highly undesirable. Further, in light of the smooth and high quality exterior finish that is required of the tape guides in order to avoid damaging the magnetic tape, there exists the possibility that the interlocking of two tape guides will cause damage to the exterior surface of the tape guides. Similar damage may result from any attempt to separate the tape guides after they have become interlocked.

It can be seen from the foregoing discussion that there exists a need in the art for a tape guide that is manufactured from thinner material so as to be less expensive. It is further apparent that there exists a need for a thinner, less expensive tape guide that is not susceptible to becoming interlocked with other tape guides.

The aforementioned problems are overcome and the foregoing objectives are achieved by the tape guide according to the present invention. The tape guide includes a substantially tubular, longitudinally extending member having first and second oppositely located ends and having interior and exterior surfaces. A slit extends along the entire length of the substantially tubular member to define first and second spaced apart and facing edge faces. An arrangement is attached to the substantially tubular member for inhibiting other tape guides from extending through the slit and becoming interlocked with the substantially tubular member. A groove can be located in each end of the substantially tubular member for properly orienting the tap guide when it is positioned in the magnetic tape cassette.

One embodiment of the arrangement for inhibiting other tape guides from extending through the slit in the cylindrical member includes a plurality of first tabs connected to the first edge face of the substantially tubular member and extending toward the second edge face and a plurality of second tabs connected to the second edge face of the substantially tubular member and extending towards the first edge face. Each one of the first tabs overlaps one of the second tabs and slots are provided adjacent the first tabs for slidably receiving the second tabs while slots are provided adjacent the second tabs for slidably receiving the first tabs.

An additional embodiment of the arrangement for inhibiting another tape guide from extending through the slit in the cylindrical member includes outdented portions extending from the first edge face that are positioned opposite to indented portions in the second edge face and outdented portions extending from the second edge face that are positioned opposite to indented portions in the first edge face.

BRIEF DESCRIPTION OF THE DRAWINGS

Preferred embodiments of the present invention will be described in greater detail with reference to the accompanying drawings, wherein like elements bear like reference numerals and wherein.

DETAILED DESCRIPTION OF THE PREFERRED EMBODIMENT

Figure 1:
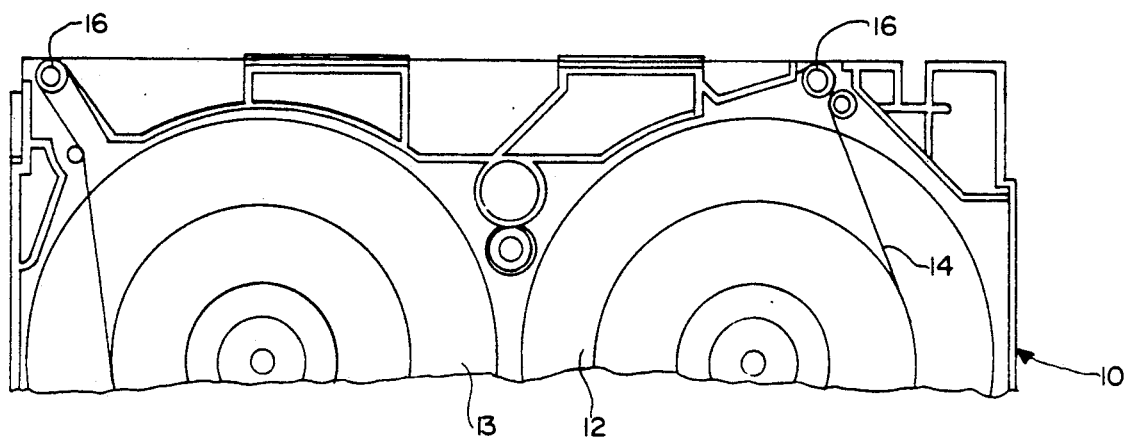
FIG. 1 is a partial top plan view of the interior of a lower section of the videotape cassette.

A videotape cassette includes a lower section 10, a portion of which is shown in FIG. 1, as well as an upper section (not shown). Two tape reels 12, 13 are contained in the lower section 10 and arranged to be rotatable. Magnetic videotape 14 is wound on the reels 12, 13. The magnetic video tape 14 extends from one reel 12, past a tape guide 16, past an access opening located along the front edge of the lower section 10, past another tape guide 16 and around the other reel 13. The tape guides 16 are located along the front edge of the lower section 10. An upper section of the tape cassette (not shown) mates with the lower section 10 of the tape cassette to enclose the magnetic tape 14.

Figure 2:
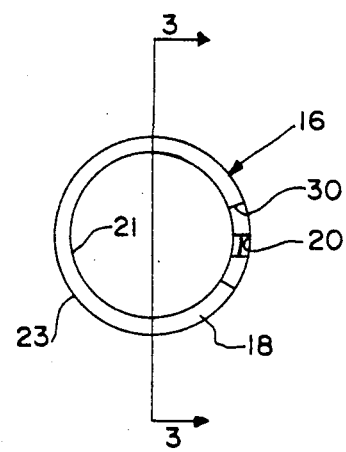
FIG. 2 is an enlarged top view of the tape guide according to a preferred embodiment of the present invention.

The tape guide 16 includes a one piece, substantially tubular member 18 as seen in FIG. 2. The member 18 is circular in cross-section and has an inner surface 21 and an outer surface 23. Extending along one side of the tubular member 18 is a slit 20.

Figure 3:
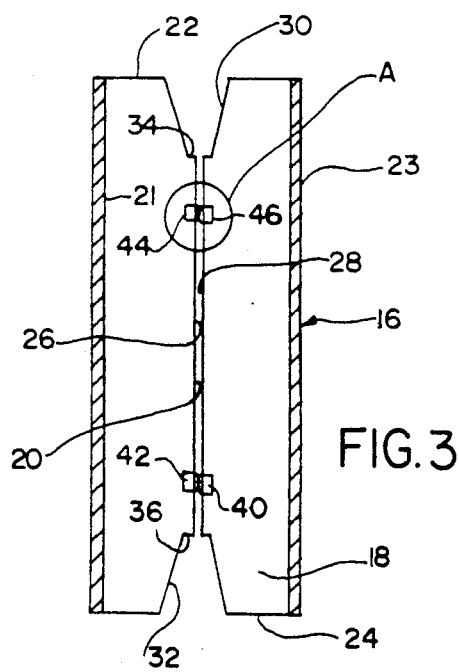
FIG. 3 is a cross-sectional view of the tape guide along the line 3—3 in FIG. 2.

The member 18 is substantially cylindrical and has a first end 22 and a second oppositely located end 24 as illustrated in more detail in FIG. 3. The slit 20 extends longitudinally along the entire length of the cylindrical member 18. The slit defines a first edge face 26 and a second edge face 28 that is positioned opposite to the first edge face 26. The first and second edge faces 26, 28 face each other and are spaced from one another so as to define a gap between the two edge faces 26, 28.

A substantially V-shaped groove 30 extends inwardly from the first end 22 of the cylindrical member 18 and another substantially identical V-shaped groove extends inwardly from the second end 24 of the cylindrical member. The two V-shaped grooves are longitudinally aligned with respect to each other and the slit 20 extending along the length of the cylindrical member 18 extends between the base portion 34 of the one V-shaped groove 30 and the base portion 36 of the other V-shaped groove 32. The V-shaped grooves 30, 32 are adapted to mate with corresponding elements (not shown) on the lower section 10 and the upper section (not shown) of the videotape cassette in order to ensure that the tape guides 16 do not rotate relative to the upper and lower sections of the videotape cassette. Further, the V-shaped grooves 30, 32 and their relationship with respect to the slit 20 serves to properly orient the tape guides relative to the magnetic tape 14. That is to say, the sensitive nature of the magnetic tape 14 is such that if the magnetic tape 14 were to slide over the slit 20 in the cylindrical member 18, the magnetic tape 14 could become damaged. Thus, the slit 20, the V-shaped grooves 30, 32 and the corresponding mating elements (not shown) on the upper and lower sections of the video tape cassette are positioned so that the slit 20 will be positioned away from the portion of the tape guides 16 over which the magnetic tape 14 slides. In that way, no damage will occur to the magnetic tape 14.

The tape guide 16 is manufactured from stainless steel having a very small thickness. The thickness of the stainless steel material is less than 0.014 inches. More particularly, the thickness of the material is approximately 0.007–0.009 inches and preferably approximately 0.008 inches.

Sheets of stainless steel are passed through several forming stations in a progressive die in order to form the substantially cylindrical member 18. The manufacturing process is such that upon exiting the progressive die, the cylindrical member 18 includes the slit 20 that extends longitudinally along the entire length of the cylindrical member 18. The stainless steel material used to manufacture the tape guide 16 possesses a certain memory or hysteresis that tends to maintain a predetermined gap between the first and second edge faces 26, 28 of the slit 20 after the cylindrical member 18 exits the die. It has been found that a gap of approximately 0.010 inches exists between the first and second edge faces 26, 28 of the slit 20 after the tape guide exits the die.

In the case of a prior art stand-alone tape guide, stainless steel having a thickness of between 0.021 and 0.022 inches is commonly used for manufacturing the tape guide, although stainless steel having a thickness of 0.015 inches has also been employed. The interaction which occurs between tape guides having such a thickness during chemical treatment, finishing, polishing and handling of the tape guides does not pose any particular problem with respect to the interlocking of the tape guides because the thickness of the tape guide is greater than the width of the gap between the edge faces of the slit. That is to say, since the thickness of the tape guides is no greater than 0.015 inches, it is not likely that one tape guide will extend through the 0.010 inch gap between the edge faces of the slit in another tape guide and thereby become interlocked. As a result, when the prior art tape guide is being chemically treated, finished, polished and otherwise handled, the tape guide will remain separated from other tape guides.

However, the present inventors have discovered that the use of substantially thinner material in the manufacture of a tape guide according to the present invention presents the possibility that the tape guide will become interlocked with another tape guide during chemical treatment, finishing, polishing and other handling. That possibility exists because the thickness of the material, 0.007–0.009 inches, is less than the width of the gap, 0.010 inches, between the edge faces of the slit. Accordingly, it is not uncommon that, when the tape guide is subjected to interaction with other tape guides during the chemical treatment, finishing, polishing and other handling of the tape guides, two or more tape guides will become interlocked.

In recognition of the aforementioned drawback, the tape guide according to the present invention is designed so as to substantially eliminate the possibility that one tape guide will become interlocked with another tape guide. In that regard and as shown in FIG. 3, an arrangement is provided for inhibiting another tape guide from extending through the slit 20 and becoming interlocked with the tape guide 16. That arrangement includes a plurality of tabs 40, 42, 44 and 46, each of which is connected to the tubular member 18 and extends across at least a portion of the gap defined by the slit 20. Each of the tabs 40, 42, 44, 46 extends over less than the entire longitudinal extent of the cylindrical member 18.

Figure 4:
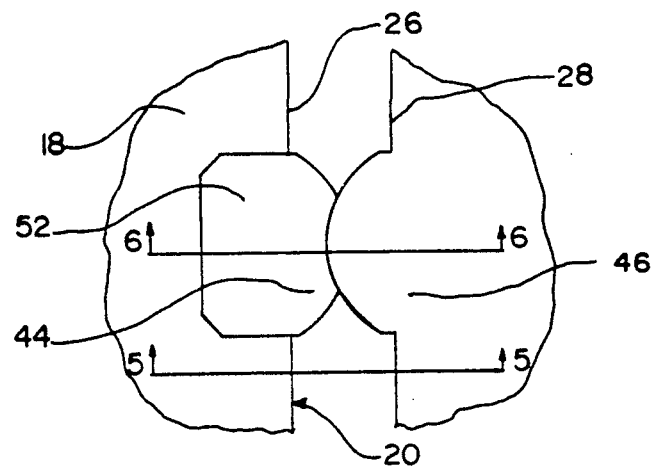
FIG. 4 is a detail view of the circled area A in FIG. 3 showing the tabs extending from both edge faces of the tubular member.

Two of the tabs 44, 46 are shown in more detail in FIG. 4. It is to be understood that the tabs 40, 42 are substantially the same as the tabs 44, 46 shown in FIG. 4 and thus, the following description relating to the tabs 44, 46 is equally applicable to the tabs 40, 42. One of the tabs 44, as seen in FIG. 4, is connected to the first edge face 26 of the cylindrical member 18 and extends towards the second edge face 28 of the cylindrical member 18. The other tab 46 is connected to the second edge face 28 of the cylindrical member and extends toward the first edge face 26 of the cylindrical member. The tabs 44, 46 are preferably positioned in pairs so that the two tabs 44, 46 overlap each other over at least a portion of their length. The overlapping portions of the tabs 44, 46 ensure that at selected portions along the length of the slit 20, the gap between the first and second edge faces 26, 28 is reduced to an extent such that the gap between the edge faces 26, 28 is less than the thickness of the cylindrical member 18. By reducing the distance between the edge faces 26, 28 in that manner, the tape guide 16 is inhibited from becoming interlocked with another tape guide.

Figure 5:
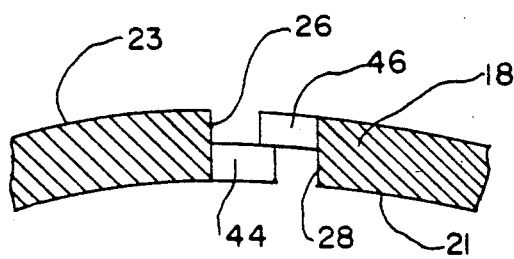
FIG. 5 is an enlarged cross-sectional view along the line 5—5 in FIG. 4 showing the overlapping nature of the tabs.

The tabs 44, 46, as illustrated in FIG. 5, are preferably designed to overlap one another to an extent such that if the gap between the first and second edge faces 26, 28 is slightly larger than 0.010 inches due to design tolerances, the tabs 44, 46 will remain overlapped. The tabs 44, 46 are also preferably designed so that when the tape guide 16 is in its relaxed state and is not subjected to any forces, the free end of the tab 44 is spaced from the second edge face 28 of the cylindrical member 18 while the free end of the tab 46 is spaced from the first edge face 26 of the cylindrical member 18.

Figure 6:
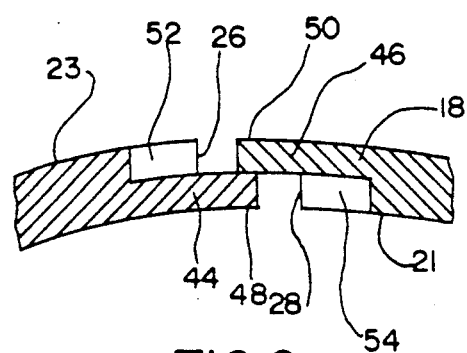
FIG. 6 is an enlarged cross-sectional view along the line 6—6 in FIG. 4 showing the tabs and the slots for slidably receiving the tabs.

It can be seen from FIG. 6 that the tab 44 is connected to the first edge face 26 such that the surface 48 of the tab 44 is flush with the inner surface 21 of the cylindrical member 18. Similarly, the tab 46 is connected to the second edge face 28 such that the surface 50 is flush with the other surface 23 of the cylindrical member 18. Further, the thickness of each of the tabs 44, 46 is less than the thickness of the cylindrical member 18. The tabs 44, 46 are formed by a coining operation.

The distance between the first and second edge faces 26, 20 defines the width of the slit 20. As pointed out above, the width of the slit 20 is greater than the thickness of the cylindrical member 18 when the cylindrical member is not subjected to any forces. The tabs 44, 46 serve to reduce the width of the slit 20 to an effective width that is less than the thickness of the cylindrical member 18. In that way, another tape guide is inhibited from extending through the slit 20 and into the tape guide 16.

As also shown in FIG. 6, a slot 52 is positioned in the first edge face 26 of the cylindrical member 18. The slot 52 is located above the tab 44 between the outer surface 23 of the cylindrical member 18 and the tab 44. Another slot 54 is positioned in the second edge face 28 of the cylindrical member 18. The slot 54 is located below the tab 46 between the inner surface 21 of the cylindrical member 18 and the tab 46. The slot 52 is positioned opposite to the tab 46 and is dimensioned to slidably receive the tab 46 when the tape guide 16 is subjected to a force that tends to push the first and second edge faces 26, 28 of the cylindrical member 18 towards one another. In a similar manner, the slot 54 is positioned opposite to the tab 44 and is dimensioned to slidably receive the tab 44 when the tape guide 16 is subjected to a force that tends to push the first and second edge faces 26, 28 of the cylindrical member 18 towards one another. The slots 52, 54 are configured so that they are open to the exterior and interior respectively of the cylindrical member 18.

The slots 52, 54 permit the tape guide 16 to give or deflect when subjected to a compression force so that the tape guide 16 will not become deformed. When the tape guide 16 is subjected to a compression force, the first and second edge faces 26, 28 will be forced towards one another and the tabs 44, 46 will slide relative to each other with the tab 44 moving toward the second edge face 28 and the tab 46 moving toward the first edge face 26. If the tape guide 16 is subjected to a large compression force, the tab 44 will be able to slide into the slot 54 and at the same time, the tab 46 will be able to slide into the slot 52.

The ability of the tape guide 16 to be compressed without being deformed as a result of the slidably interfitting tabs 44, 46 and slots 52, 54 is desirable because any deformations on the exterior surface of the tape guide can cause damage to the magnetic tape. Since the guide tapes 16 can deflect when subjected to a compressive force, the possibility that the tape guide will be deformed is reduced and thus, the integrity of the magnetic tape that passes over the tape guide can be maintained.

Although the tape guide 16 has been described above as including two pairs of oppositely positioned overlapping tabs 40, 42, 44, 46, it is to be understood that other arrangements could also be employed while still maintaining the underlying purpose of preventing the tape guide from becoming interlocked with another tape guide. For example, more than two pairs of oppositely positioned tabs could be placed along the first and second edge faces 26, 28 of the cylindrical member 18. Alternatively, the tabs could be staggered along the first and second edge faces 26, 28 of the cylindrical member 18 so that the tabs are not oppositely positioned with respect to one another. In such an embodiment, each of the tabs should still extend more than halfway across the gap formed by the slit 20 so as to ensure that the tape guide cannot become interlocked with another tape guide. It may also be desirable to provide a single pair of oppositely positioned overlapping tabs that are located midway along the length of the slit 20. As an alternative to the arrangement depicted in FIG. 6 where the tabs 44, 46 are of substantially the same length and each tab 44, 46 extends slightly more than halfway across the gap formed by the slit 20, the oppositely positioned tabs in each pair can be of different lengths with one of the tabs of the pair extending farther across the gap than the tabs depicted in FIG. 6 and the other tab of the pair extending not as far across the gap as the tab shown in FIG. 6. In that arrangement the tabs should still be designed to overlap one another by a small amount. As an additional alternative, it may be desirable to simply include a single unopposed tab extending from either the first edge face or the second edge face. In all of the above-described alternatives, the arrangement of the tab or tabs is such that the width of the slit in the cylindrical member is reduced to an effective width that is less than the thickness of the cylindrical member.

Figure 7:
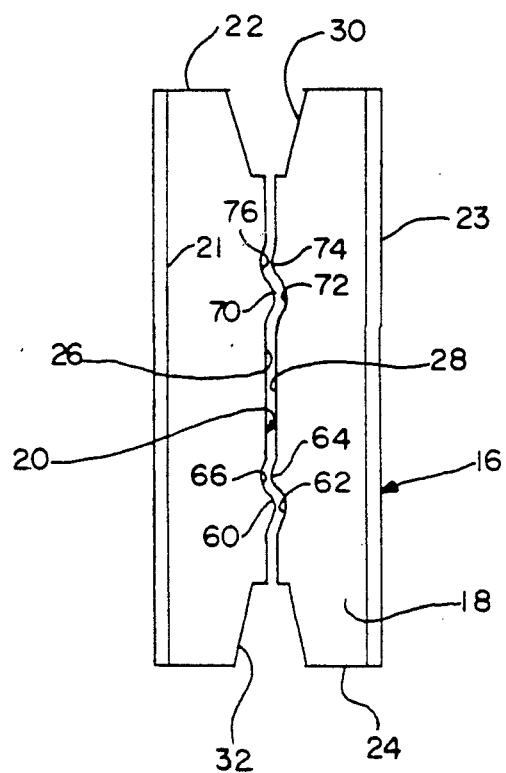
FIG. 7 is a cross-sectional view of a second embodiment of the tape guide along the line 3—3 in FIG. 2.

A second embodiment of the arrangement for inhibiting another tape guide from extending through the slit 20 and becoming interlocked with the tape guide 16 includes, as shown in FIG. 7, inwardly curved portions 66, 76 of the first surface 26 that extend away from the second surface 28 so as to form indented areas. Outwardly curved portions 60, 70 of the first edge face 26 extend toward the second edge face 28 so as to form outdented areas. The second edge face 28 includes inwardly curved portions 62, 72 that extend away from the first edge face 26 so as to form indents in the second face 28 and outwardly curved portions 64, 74 that extend toward the first edge face 26 so as to form outdents in the second face.

The outdented portions 60, 70 extending from the first edge face 26 are positioned opposite to the indents 62, 72 in the second edge face 28. Similarly, the outdented portions 64, 74 extending from the second edge face 28 are positioned opposite to the indented portions 66, 76 in the first edge face 26.

It can be readily seen that the tape guide 16 of the present invention as illustrated in FIG. 7 is inhibited from becoming interlocked with another tape guide due to the interfitting nature of the outdented portions 60, 70, 64, 74, and the indented portions 62, 72, 66, 76, respectively. Although the outdented portions 60, 70, 64, 74, and the indented portions 62, 72, 66, 76, do not contact one another, the tape guide 16 is inhibited from becoming interlocked with another tape guide as a result of the fact that the outdented portions 60, 70 extend beyond the plane of the second edge face 28 while the outdented portions 64, 74 extend beyond the plane of the first edge face 26. Thus, because the outdented portions extend across the gap formed by the slit 20, it is very unlikely that another tape guide will be able to extend through the slit 20 so as to become interlocked with the tape guide 16. In a manner similar to that noted above with respect to the embodiment depicted in FIG. 3, the arrangement shown in FIG. 7 serves to reduce the width of the slit 20 to an effective width that is less than the thickness of the cylindrical member 18.

While the embodiment depicted in FIG. 7 is shown and described as including two outdented portions and two indented portions on each of the edge faces 26, 28, it should be understood that more than or less than two outdented and two indented portions may be provided on each edge face 26, 28.

Since the tape guides 16 are manufactured from thinner material than prior art stand-alone tape guides cost, savings can be achieved in two respects. First, material costs associated with the manufacture of the tape guide can be significantly reduced. In particular, at least a fifty percent reduction in material costs can be realized through use of thinner material as described above. Second, since the initial production of thinner material requires more rolling and forming steps than the initial production of thicker material, the exterior surface of the thinner material tends to possess an exterior surface that is smoother and that has a higher quality finish. Because a tape guide requires a very high quality exterior finish in order to ensure that the magnetic tape which slides over the tape guide is not damaged, the use of thinner material to manufacture the tape guides reduces the costs associated with chemically treating, finishing and polishing the tape guide as a result of the fact that the thinner material possesses a smoother exterior surface and consequently, less chemical treatment, finishing and polishing of the tape guide is required. The tape guide according to the present invention should preferably have a surface roughness of eight microinches or less in order to ensure that the magnetic tape that slides over the tape guide is not damaged. A further benefit associated with the manufacture of a tape guide from thinner material is that the time required to manufacture the tape guide is reduced because the tape guide need not be subjected to the same amount of chemical treatment, finishing and polishing as a thicker tape guide.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention. Accordingly, it is expressly intended that all such variations, modifications, changes and equivalents which fall within the spirit and scope of the present invention as defined in the claims, be embraced thereby.

What is claimed is:

1. A tape guide for guiding magnetic tape in a magnetic tape cassette comprising:

a substantially tubular, longitudinally extending member having first and second oppositely positioned ends and interior and exterior surfaces, said substantially tubular member having a slit extending along its enter length that defines first and second longitudinally extending edge faces; and means extending from said substantially tubular member for inhibiting other tape guides from extending through the slit and into the substantially tubular member so as to prevent other tape guides from interlocking with said tape guide, wherein said means for inhibiting other tape guides from extending through the slit includes a first tab extending from the first edge face and towards the second edge face.

2. The tape guide according to claim 1, wherein said first and second longitudinally extending edge faces face each other.

3. The tape guide according to claim 2, wherein said substantially tubular member is one piece.

4. The tape guide according to claim 2, wherein said first and second edge faces are spaced apart from each other.

5. The tape guide according to claim 1, wherein said substantially tubular member includes means for properly orienting the tape guide when the tape guide is positioned in the magnetic tape cassette.

6. The tape guide according to claim 3, wherein said means for properly orienting the tape guides includes a groove located in the first end of the substantially tubular member and a groove located in the second end of the substantially tubular member, said grooves being V-shaped with a base portion, said slit extending between the base portion of the V-shaped groove in the first end of the substantially tubular member and the base portion of the V-shaped groove in the second end of the substantially tubular member.

7. The tape guide according to claim 1, wherein the thickness of said substantially tubular member is less than 0.014 inches.

8. The tape guide according to claim 1, wherein the thickness of said substantially tubular member is between approximately 0.007 and 0.009 inches.

9. The tape guide according to claim 1, wherein said means for inhibiting other tape guides from extending through the slit includes at least one second tab extending from the substantially tubular member, said at lest one second tab extending from the second edge face and toward the first edge face, said at least one second tab extending over less than the entire longitudinal extent of the first edge face and said first and second tabs being positioned opposite to one another and overlapping each other.

10. The tape guide according to claim 9, wherein said first edge has a slot located therein that is positioned between the first tab and the interior surface of the substantially tubular member for slidably receiving the second tab when the first and second edge faces are pushed towards one another, and said second edge face having a slot located therein that is positioned between the second tab and the exterior surface of the substantially tubular member for slidably receiving the first tab when the first and second edge faces are pushed towards one another.

11. The tape guide according to claim 1, wherein said means for inhibiting other tape guides from extending through the slit includes a plurality of spaced apart and unconnected first tabs extending from the substantially tubular member, said first tabs extending beyond the first edge face and toward the second edge face of the substantially cylindrical member.

12. The tape guide according to claim 11, wherein said means for inhibiting other tape guides from extending into the slit includes a plurality of spaced apart and unconnected second tabs extending from the substantially tubular member, said second tabs extending beyond the second edge face and toward the first edge face of the substantially tubular member, one of said first tabs overlying each one of said second tabs.

13. The tape guide according to claim 12, wherein said substantially tubular member has a plurality of slots located in the first edge face, each of which is positioned between one of the first tabs and the interior surface of the substantially tubular member for slidably receiving one of the second tabs when the first and second edge faces are pushed towards one another, and a plurality of slots located in the second edge face, each of which is positioned between one of the second tabs and the exterior surface of the substantially tubular member for slidably receiving one of said first tabs when the first and second edge faces are pushed toward one another.

14. A tape guide for guiding magnetic tape in magnetic tape cassette comprising:

a substantially tubular, longitudinally extending member having first and second oppositely positioned ends and interior and exterior surfaces, said substantially tubular member having a slit extending along its entire length that defines first and second edge faces; and means extending from said substantially tubular member for inhibiting other tape guides from extending through the slit and into the substantially tubular member so as to prevent other tape guides from interlocking with said tape guide, wherein said means for inhibiting other tape guides from extending through the slit includes an outwardly curved outdented portion of the first edge face which extends toward the second edge face and an oppositely located inwardly curved indented portion of the second edge face.

15. The tape guide according to claim 1, wherein said first and second edge faces face each other and are spaced apart from each other.

16. The tape guide according to claim 1, wherein said substantially tubular member further includes means for orienting the tape guide when it is positioned in the magnetic tape cassette.

17. The tape guide according to claim 16, wherein said means for orienting the tape guide includes a V-shaped groove located in said first end of the substantially tubular member and a V-shaped groove located in said second end of the substantially tubular member, said grooves being longitudinally aligned with respect to each other and each groove having a base portion, said slit extending between said base portions of the two V-shaped grooves.

18. The tape guide according to claim 1, wherein the thickness of said substantially tubular member is less than 0.014 inches.

19. The tape guide according to claim 1, wherein the thickness of said substantially tubular member is between approximately 0.007 and 0.009 inches.

* * * * *